(12) United States Patent
Inaba et al.

(10) Patent No.: US 7,973,118 B2
(45) Date of Patent: Jul. 5, 2011

(54) INK RECEIVING PARTICLES, METHOD FOR PRODUCING THE SAME, AND CURABLE RESIN DISPERSION COMPOSITION

(75) Inventors: Yoshihiro Inaba, Kanagawa (JP);
Kentaro Ageishi, Kanagawa (JP);
Takako Kobayashi, Kanagawa (JP);
Ryosaku Igarashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 104 days.

(21) Appl. No.: 12/543,885

(22) Filed: Aug. 19, 2009

(65) Prior Publication Data
US 2010/0227982 A1    Sep. 9, 2010

(30) Foreign Application Priority Data
Mar. 3, 2009    (JP) ................................. 2009-049374

(51) Int. Cl.
*C08F 220/04*    (2006.01)
*C08L 33/02*    (2006.01)
*C08L 75/16*    (2006.01)

(52) U.S. Cl. ........ 526/318; 525/100; 525/118; 525/123; 525/131; 525/139; 525/143; 525/162; 525/170; 525/187; 525/223

(58) Field of Classification Search .................. None
See application file for complete search history.

(56) References Cited

U.S. PATENT DOCUMENTS

| | | | |
|---|---|---|---|
| 5,922,789 A | 7/1999 | Kohlhammer et al. | |
| 6,514,615 B1 * | 2/2003 | Jones et al. | 428/402 |
| 6,620,889 B1 * | 9/2003 | Mertens et al. | 525/221 |
| 2003/0068571 A1 | 4/2003 | Uehara et al. | |
| 2005/0003288 A1 * | 1/2005 | Sugiyama et al. | 430/108.1 |
| 2005/0249896 A1 | 11/2005 | Chen et al. | |
| 2007/0242124 A1 | 10/2007 | Tomita et al. | |
| 2007/0269732 A1 * | 11/2007 | Matsumura et al. | 430/114 |
| 2009/0042393 A1 * | 2/2009 | Takakuma et al. | 438/693 |

FOREIGN PATENT DOCUMENTS

| | | |
|---|---|---|
| JP | 5-239308 A * | 9/1993 |
| JP | A-8-176428 | 7/1996 |
| JP | A-10-301221 | 11/1998 |
| JP | A-2000-94654 | 4/2000 |
| JP | A-2000-326626 | 11/2000 |
| JP | A-2000-343808 | 12/2000 |
| JP | A-2003-57967 | 2/2003 |
| JP | 2003-277113 A * | 10/2003 |
| JP | A-2004-25481 | 1/2004 |
| JP | A-2005-325352 | 11/2005 |
| JP | A-2006-110986 | 4/2006 |
| JP | A-2006-256020 | 9/2006 |
| JP | A-2006-327166 | 12/2006 |
| JP | A-2006-335004 | 12/2006 |
| JP | A-2006-346879 | 12/2006 |
| JP | A-2008-093963 | 4/2008 |

OTHER PUBLICATIONS

Japanese Office Action issued in Japanese Patent Application No. 2009-049374 dated Nov. 9, 2010 (with translation).

* cited by examiner

*Primary Examiner* — Robert Sellers
(74) *Attorney, Agent, or Firm* — Oliff & Berridge, PLC

(57) ABSTRACT

Ink receiving particles is provided. The ink receiving particles includes polymer particles, the polymer particles including a resin including an acidic group and a polyoxyethylene chain, the acidic group at least partially having a salt structure.

19 Claims, No Drawings

INK RECEIVING PARTICLES, METHOD FOR PRODUCING THE SAME, AND CURABLE RESIN DISPERSION COMPOSITION

CROSS-REFERENCE TO RELATED APPLICATIONS

This application is based on and claims priority under 35 USC 119 from Japanese Patent Applications No. 2009-049374 filed Mar. 3, 2009.

BACKGROUND

1. Technical Field

The present invention relates to ink receiving particles, a method for producing the particles, and a curable resin dispersion composition.

2. Related Art

An inkjet recording technique is one method of recording images or data using ink, The principle of the inkjet recording technique is to perform recording on paper, cloth, film or the like, by ejecting a liquid ink or a molten solid ink through a nozzle, a slit, a porous film or the like. Various systems for ejecting ink have been proposed, such as an electric charge control system, by which ink is ejected using an electrostatic attractive force; a drop-on-demand system (pressure pulse system), by which ink is ejected using the oscillating pressure of a piezoelectric element; and a thermal inkjet system, by which ink is ejected using pressure generated by forming and growing air bubbles by high temperatures. Recorded materials with images or data having extremely high precision may be obtained by these systems.

In techniques of recording using ink, including the inkjet recording technique, a technique of recording an image or data on an intermediate transfer body and then transferring the image or data to a recording medium has been suggested, so as to perform recording at high image quality on various recording media such as a permeable medium or a non-permeable medium.

SUMMARY

According to an aspect of the present invention, ink receiving particles including polymer particles, the polymer particles including a resin including an acidic group and a polyoxyethylene chain, the acidic group at least partially having a salt structure, are provided.

DETAILED DESCRIPTION

Hereinafter, the present invention will be described in detail by way of exemplary embodiments.

<Ink Receiving Particles and Method for Producing Ink Receiving Particles>

The ink receiving particles according to an exemplary embodiment of the invention includes polymer particles including a resin including an acidic group and a polyoxyethylene chain, the acidic group at least partially having a salt structure.

The ink receiving particles of the exemplary embodiment may receive ink. The term "ink receiving" means holding at least a portion of the ink components (at least the liquid component).

According to the ink receiving particles of the exemplary embodiment, since the resin component which is a component of the polymer particles has an acidic group, and includes a structural unit in which the acidic group at least partially has a salt structure, when the particles receive ink, the ink first adheres to the ink receiving particles, and then at least the liquid component of the ink penetrates into the voids between the polymer particles that are the components of the ink receiving particles. At this time, although the reason is still unclear, the coloring component among the ink components, irrespective of being a pigment or a dye, is adsorbed to the surface of the ink receiving particles and is remained on the surface efficiently. Thereby, the ink receiving particles of the exemplary embodiment may receive ink without diffusing the coloring component.

Since the ink receiving particles of the exemplary embodiment include a resin having a structural unit having a polyoxyethylene chain, the affinity to the curable resin that will be described later may become good, and high quality images may be obtained.

In the ink receiving particles of the exemplary embodiment, when the ratio of the acidic group and the polyoxyethylene chain (or polyoxypropylene chain), or the degree of crosslinking are controlled, the absorption rate of the ink receiving particles is adjusted, excessive swelling of the ink receiving particles may be suppressed, and bleeding of the ink or the like may be avoided.

When the ink receiving particles of the exemplary embodiment of the invention that have received ink, is transferred onto a recording medium, high quality image recording may be performed.

According to the ink receiving particles of the exemplary embodiment of the invention, penetration of the liquid component of the ink into the voids between the polymer particles involves capture of the liquid by the physical particle wall structure. However, since the particle walls are hydrophilic, the speed of liquid absorption is high, and the drying time is short. For this reason, the ink receiving particles that have received ink may be transferred onto various recording media in a short time, regardless of whether the recording medium is a penetrable medium or a non-penetrable medium.

Hereinafter, the constitution of the ink receiving particles according to the exemplary embodiment of the invention will be described, together with the method for production thereof.

(Polymer Particles)

The polymer particles used in the ink receiving particles of the exemplary embodiment of the invention are in a form of particles that are obtained by, for example, aggregation or coalescence of a resin. The polymer particles include a resin including an acidic group and a polyoxyethylene chain, and of the acidic group at least partially has a salt structure. Since the acidic group, which at least partially has a salt structure, in the polymer particles, has high hydrophilicity, the liquid component (for example, water or an aqueous solvent) in the ink that contacts with the ink receiving particles including the polymer particles, efficiently penetrates into the particles, and thus the ability of the particles to retain the liquid component is enhanced. Therefore, for example, even if a variety of inks are used, high speed recording on various recording media may be performed.

On the other hand, if the penetrability of the liquid component is too high, the ink receiving particles may swell too much, and thereby, for example, if the particles having received the ink are transferred onto a recording medium, the gaps between the particles may be enlarged and broadened, so that the image may be disordered.

Furthermore, since the polyoxyethylene chain has good affinity with the curable resin, if the ink receiving particles including the polymer particles are used, images of higher quality may be recorded. The ink receiving particles of the exemplary embodiment may further include a polyoxypropylene chain, from the viewpoint that sharp images may be obtained at a high density. Here, examples of the resin having a polyoxyethylene chain (in some instances, further having a polyoxypropylene chain) include resins in which the length of polyoxyethylene or polyoxypropylene (number of repeating units) is 1 or more and 30 or less, and the polyoxyethylene chain or the polyoxypropylene chain may be included in the main chain, or may be included in a side chain.

On the other hand, examples of the acidic group include a carboxyl group and a sulfo group, but from the viewpoint that the ink receiving particles may be readily produced by an emulsion polymerization method as will be described below, a carboxyl group is preferred. Because many of the monomers having a carboxyl group are relatively hydrophobic, the ink receiving particles may be easily produced by an emulsion polymerization method.

The ink receiving particles of the exemplary embodiment may be produced by an emulsion polymerization method. When an emulsion polymerization method is employed, the thus obtained ink receiving particles (the ink receiving particles that contain a resin obtained by an emulsion polymerization method, and are obtained by additional processes such as aggregation) have a porous structure. The ink receiving particles having a porous structure have an increased speed of water absorption, and a shortened drying time. Therefore, the ink receiving particles having received an ink may be transferred onto various recording media in a shorter time, regardless of whether the recording medium is a penetrable medium or a non-penetrable medium.

In the ink receiving particles of the exemplary embodiment, the overall water absorbability of the particles may be easily controlled by controlling the ratio of the acidic group and the polyoxyethylene chain (or polyoxypropylene chain), and the degree of crosslinking.

Specifically, according to the exemplary embodiment, the water absorption ratio of the ink receiving particles is preferably 200% (or about 200%) or higher and 5000% (or about 5000%) or less, and more preferably 400% or more and 3000% or less.

If the water absorption ratio is less than 200%, the liquid once trapped in the voids of the particles may become prone to overflow from the void areas at the time of transfer of the particles onto the recording medium, or to deteriorate images. If the absorption ratio exceeds 5000%, not only the water absorption but also moisture absorption may become active, and therefore, the environmental dependency of the handling of the ink receiving particles may be increased, so that it may become difficult to use the particles. Furthermore, the storability of images in a high-humidity environment may be deteriorated.

Here, the water absorption ratio according to the exemplary embodiment can be measured according to JIS K7209 (1984), the disclosure of which is incorporated by reference herein. The details will be described later.

The resin included in the polymer particles of the exemplary embodiment is preferably a polymer including structural unit (A) and structural unit (B) which are represented by the following structural formula (I).

Structural Formula (I)

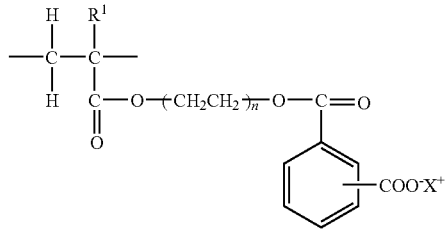

(A)

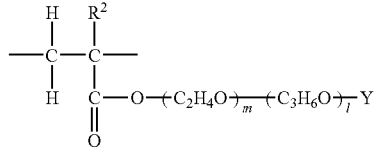

(B)

In structural formula (I), $R^1$ and $R^2$ each independently represent a hydrogen atom or a methyl group; n represents an integer of from 1 to 18. m represents an integer of from 1 to 30. l represents an integer of from 1 to 18. $X^+$ represents an alkali metal ion, an alkaline earth metal ion, or a quaternary ammonium ion. Y represents an alkyl group having 1 to 30 carbon atoms or an aryl group having 6 to 18 carbon atoms.

$R^1$ is preferably a methyl group. $R^2$ is preferably a methyl group. n is preferably 1 or more and 8 or less, m is preferably 1 or more and 8 or less, and l is preferably 1 or more and 9 or less. $X^+$ is preferably an alkali metal ion, and Y is preferably an alkyl group having 1 to 18 carbon atoms, or an aryl group having 6 to 14 carbon atoms.

Hereinafter, specific examples of the structural unit (A) and the structural unit (B) will be presented below, but the exemplary embodiment is not limited to these.

Examples of (A) include a methacryloyloxyethyl monophthalate polymer structural unit, a methacryloyloxyethyl monoisophthalate polymer structural unit, and a methacryloyloxyethyl monoterephthalate polymer structural unit. Examples of (B) include a phenoxypolyethylene glycol-methacrylate polymer structural unit, a lauroxypplyethylene glycol-methacrylate polymer structural unit, a stearoxypolyethylene glycol-methacrylate polymer structural unit, an octoxypolyethylene glycol-polypropylene glycol-methacrylate polymer structural unit, and a phenoxypolyethylene glycol-polypropylene glycol-methacrylate polymer structural unit.

The resin contained in the polymer particles according to an exemplary embodiment of the invention may be, for example, a homopolymer of a hydrophilic monomer represented by the structural unit (A), or a copolymer formed by using two monomers, i.e., a hydrophilic monomer represented by the structural unit (A) and a hydrophobic monomer represented by the structural unit (B). The resin contained in the polymer particle may be a so-called weakly water-absorptive resin, which is saturated by a certain extent of water absorption (liquid absorption).

Here, the term "hydrophilic monomer" includes a monomer that is hydrophobic itself, but is readily hydrophilized after polymerization.

The hydrophilic monomer component that is a component in the resin may also include an additional structural unit derived from a monomer having another structure, in addition to the structural unit (A). As for the monomer having another structure, a monomer having an acidic group is preferable. Specifically, it is preferable to use a monomer having a carboxyl group and to subject the carboxylic acid to a neutralization reaction with a base such as NaOH after polymerization to form a salt (neutralized salt structure, in view of obtaining favorable water absorbability. Particularly, it is preferable to use an ethylenic unsaturated monomer having a carboxyl group.

Examples of the monomer having a carboxyl group, which may be used in the exemplary embodiment, include acrylic acid, methacrylic acid, methacryloyloxyethyl monohexahydrophthalate, methacryloyloxyethyl monomaleate, methacryloyloxyethyl monosuccinate, methacryloyloxyethyl monophthalate, methacryloyloxyethyl monoisophthalate, methacryloyloxyethyl monoterephthalate, acryloyloxyethyl monophthalate, acryloyloxyethyl monohexahydrophthalate, acryloyloxyethyl monosuccinate and the like.

The hydrophobic monomer may be, for example, a monomer having a hydrophobic group, and specific examples thereof include olefins (ethylene, butadiene, and the like), styrene, α-methylstyrene, α-ethylstyrene, methyl methacrylate, ethyl methacrylate, butyl methacrylate, acrylonitrile, vinyl acetate, methyl acrylate, ethyl acrylate, butyl acrylate, lauryl methacrylate, and the like. Examples of hydrophobic unit or monomer include styrene derivatives such as styrene, α-methylstyrene and vinyltoluene; vinylcyclohexane, vinylnaphthalene, vinylnaphthalene derivatives, acrylic acid alkyl esters, acrylic acid phenyl esters, methacrylic acid alkyl esters, methacrylic acid phenyl esters, methacrylic acid cycloalkyl esters, crotonic acid alkyl esters, itaconic acid dialkyl esters, maleic acid dialkyl esters; polyolefins such as polyethylene, ethylene/vinyl acetate and polypropylene; and derivatives of these.

In regard to the resin contained in the polymer particles according to the exemplary embodiment, the molar ratio of the hydrophilic unit (part formed a hydrophilic monomer(s)) and the hydrophobic unit (part formed from a hydrophobic monomer(s)) (hydrophilic monomer: hydrophobic monomer) is preferably in the range of 5:95 to 90:10, more preferably in the range of 7:93 to 80:20, and even more preferably in the range of 10:90 to 70:30. When the amount of the hydrophilic monomer is in the above-described range, the speed of liquid absorption and the amount of liquid absorption in the case where the ink receiving particles absorb a liquid such as an aqueous medium in the ink, may be controlled to an appropriate range. Furthermore, for example, in the case of disposing the ink receiving particles on an intermediate transfer body without irregularity, electrical chargeability of the particles is required to some extent, but when the particles are imparted with hydrophobicity, the particles are imparted with electrical chargeability to a certain extent.

In the copolymer including the structural unit (A) and the structural unit (B), as represented by structural formula (I), that the molar ratio of the structural unit (A) and that of the structural unit (B) are each preferably 10% by mole (or about 10% by mole) and more and 90% by mole (or about 90% by mole) or less, from the viewpoints of the ease of controlling the balance between hydrophilicity and hydrophobicity, the ease of controlling the particle size, and the like.

More specifically, it is preferable that the molar ratio P of the structural unit (A) in the copolymer is 10% by mole (or about 10% by mole) or more and 90% by mole (or about 90% by mole) or less, the molar ratio of the structural unit (b) is the balance (100–P).

The resin contained in the polymer particles according to the exemplary embodiment may have a straight-chained structure or may have a branched structure. That is, the resin may be a random copolymer or block copolymer having a straight-chained structure. A polymer having a branched structure (examples thereof including a random copolymer, block copolymer or graft copolymer having a branched structure) may be suitably used as the resin.

The resin may contain a crosslinked structure. When the crosslinked structure is contained in the resin, the amount of liquid absorption may be constant, and excessive swelling may be suppressed. This crosslinked structure may be synthesized by adding a small amount of a so-called crosslinking agent such as divinylbenzene or a di(meth)acrylate at the time of synthesis, or by adding a large amount of an initiator together with a crosslinking agent.

As for the crosslinking agent that may be used, a known crosslinking agent may be selected and used. Examples of the crosslinking agent include divinylbenzene, ethylene glycol di(meth)acrylate, diethylene glycol di(meth)acrylate, methylenebis(meth)acrylamide, glycidyl(meth)acrylate, 2-([1'-methylpropylidenamino]carboxylamino)ethyl methacrylate, and the like. Among these, divinylbenzene, ethylene glycol di(meth)acrylate and diethylene glycol di(meth)acrylate are more preferred, and divinylbenzene is further preferable.

The amount of addition of the crosslinking agent is preferably 0 parts by weight or more and 5 parts by weight or less, and more suitably 0 parts by weight or more and 3 parts by weight or less, relative to 100 parts by weight of the total monomer components.

The resin is preferably an amorphous resin, and the glass transition temperature (Tg) of the resin is preferably 0° C. (or about 0° C.) or higher and 100° C. (or about 100° C.) or lower, and more preferably 20° C. or higher and 80° C. or lower. When the glass transition temperature is in the above-mentioned range, the storability of images after fixation may be increased, and the particles that have been coalesced in the production of the ink receiving particles as will be described later, may become easily pulverized.

The glass transition temperature is determined from the main peak measured according to ASTM D3418-8, the disclosure of which is incorporated by reference herein. For the measurement of the main peak, DSC-7 (trade name) manufactured by PerkinElmer, Inc. is used. For temperature calibration of the detection unit of this apparatus, the melting points of indium and zinc are used, and for calorie calibration, the heat of fusion of indium is used. The measurement is performed using a pan made of aluminum for test samples, while using a blank pan for control, at a rate of temperature increase of 10° C./min.

The weight average molecular weight of the resin is preferably 1,000 (or about 1,000) or more and 1,000,000 (or about 1,000,000) or less, and more preferably 5,000 or more and 500,000 or less. When the weight average molecular weight is in the above-mentioned range, a balance among rapid liquid absorption, realization of favorable fixation, and image strength after fixation, may be enabled. The weight average molecular weight may be measured the following conditions. For example, for the gel permeation chromatography (GPC), an apparatus "HLC-8120 GPC, SC-8020" (trade name, manufactured by Tosoh Corp,)" is used. As the columns, two pieces of "TSKGEL, SUPER HM-H" (trade name, manufactured by Tosoh Corp., 6.0 mm ID×15 cm) are used. As an eluent, THF (tetrahydrofuran) is used. As for the experiment conditions, a sample concentration of 0.5%, a flow rate of 0.6 ml/min, an amount of sample injection of 10 µl, and a measurement temperature of 40° C. are used, and the measurement is performed using an IR detector. The calibration curve is prepared using ten samples of "polystyrene standard samples TSK STANDARD": "A-500", "F-1", "F-10", "F-80", "F-380", "A-2500", "F-4", "F-40", "F-128" and "F-700" (trade names), all manufactured by Tosoh Corp.

The acid value of the resin may be, in terms of carboxyl group (—COOH) equivalent, 50 mg KOH/g (or about 50 mg KOH/g) or more and 1000 mg KOH/g (or about 1000 mg KOH/g) or less, more preferably 150 mg KOH/g or more and 500 mg KOH/g or less, and even more preferably 100 mg KOH/g or more and 300 mg KOH/g or less. When the acid value is in the above-mentioned range, control of the particle handlability, water absorbability and fixability may be enabled. The measurement of acid value in terms of carboxyl group (—COOH) is performed as follows.

The acid value is measured by using a neutralization titration method carried out according to JIS K0070, the disclosure of which is incorporated by reference herein. That is, an appropriate amount of a sample is taken, and 100 ml of a solvent (a mixed liquid of diethyl ether/ethanol) and several drops of an indicator (phenolphthalein solution) are added to the sample. The mixture is sufficiently shaken to mix in a water bath until the sample completely dissolves. This mixture is titrated with a 0.1 mol/l ethanol solution of potassium hydroxide, and the time point when the light red color of the indicator is sustained for 30 seconds, is taken as the end point. When the acid value is designated as A, the amount of sample is designated as S (g), the amount of the 0.1 mol/l ethanol solution of potassium hydroxide used in the titration is designated as B (ml), and the factor of the 0.1 mol/l ethanol solution of potassium hydroxide is designated as f, the acid value is calculated by the formula: $A=(B \times f \times 56.11)/S$.

The polymer particles according to the exemplary embodiment may further contain another resin component (additional resin component).

The resin component (additional resin component) may be, for example, a thermoplastic binding resin or the like, and specific examples include a homopolymer or a copolymer of a styrene such as styrene, parachlorostyrene or α-methylstyrene (styrene-based resin); a homopolymer or a copolymer of an ester having a vinyl group, such as methyl (meth)acrylate, ethyl(meth)acrylate, n-propyl (meth)acrylate, n-butyl(meth) acrylate, lauryl(meth)acrylate, 2-ethylhexyl(meth)acrylate, or lauryl(meth)acrylate (vinyl-based resin); a homopolymer or a copolymer of a vinylnitrile such as acrylonitrile or methacrylonitrile (vinyl-based resin); a homopolymer or a copolymer of a vinyl ether such as vinyl methyl ether or vinyl isobutyl ether (vinyl-based resin); a homopolymer or a copolymer of a vinyl ketone such as vinyl methyl ketone, vinyl ethyl ketone or vinyl isopropenyl ketone (vinyl-based resin); a homopolymer or a copolymer of an olefin such as ethylene, propylene, butadiene or isoprene (olefin-based resin); a non-vinyl, condensed resin such as an epoxy resin, a polyester resin, a polyurethane resin, a polyamide resin, a cellulose resin or a polyether resin; a graft polymer of such a non-vinyl, condensed resin and a vinyl-based monomer; and the like. Only one kind of the resin may be used, or two or more kinds of the resin may be used in combination. Among these resins, a styrene-based resin, a vinyl-based resin, a polyester resin, and an olefin-based resin are preferred, and a copolymer of styrene and n-butyl(meth)acrylate, an n-butyl (meth)acrylate-bisphenol A-fumaric acid copolymer, and a copolymer of styrene and an olefin are particularly preferred.

(Production of Ink Receiving Particles)

Next, the method for producing ink receiving particles of the exemplary embodiment will be explained.

The method for producing ink receiving particles of the exemplary embodiment includes preparing polymer particles including a resin including an acidic group and a polyoxyethylene chain, and having a volume average particle size of 1 μm (or about 1 μm) or less (polymer particle preparation step); neutralizing the acidic group of the polymer particles with a base (neutralization step); and aggregating the polymer particles to form aggregated particles (aggregated particle formation step).

When a copolymer including a structural unit (C) and a structural unit (D), as represented by the following structural formula (II), is used as the resin including an acidic group and a polyoxyethylene chain, which is used in the production of the ink receiving particles of the exemplary embodiment, a copolymer including a structural unit (A) and a structural unit (B), as represented by the above-described structural formula (I) may be obtained.

Structural Formula (II)

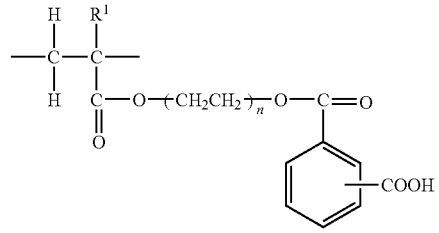

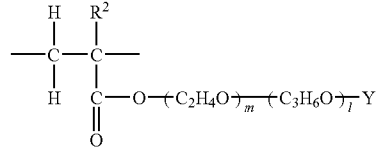

$R^1$, $R^2$, n, m, l and Y in structural formula (II) have the same meanings as defined for $R^1$, $R^2$, n, m, l and Y in structural formula (I).

Hereinafter, the method for producing ink receiving particles of the exemplary embodiment in the case of using the copolymer including a structural unit (C) and a structural unit (D), as represented by the structural formula (II), will be described.

According to the investigation of the production method of the ink receiving particles, although the reason is still unclear, it was found that if a monomer serving as the structural unit having an acidic group, and a monomer having a polyoxyethylene chain are mixed and suspension polymerized in water, particle aggregation may easily occur during polymerization, and it may be difficult to form uniform ink receiving particles.

For this reason, the ink receiving particles of the exemplary embodiment may be produced by forming in advance polymer particles including a resin having the structural units represented by the structural formula (II) by emulsion polymerization or the like, mixing the polymer particles to granulate (forming aggregates) in an aqueous medium, and then performing a neutralization reaction, and thus ink receiving particles may be obtained. Alternatively, the ink receiving particles may also be produced by forming in advance polymer particles including a resin having the structural units represented by the structural formula (II) by emulsion polymerization or the like, performing a neutralization reaction, subsequently aggregating and coalescing (forming aggregates) these polymer particles, and then pulverizing the resulting coalesced product. Through this method, the ink receiving particles including a liquid absorptive resin may be obtained by a simple and convenient process.

With respect to the aggregates obtained by the forming of aggregates as described above, the polymer particles may be in a coalesced state, may be in an aggregated state, or may be in a state in which both of aggregation and coalescence occur. Here, the term aggregation means a state in which, when the polymer particles are observed with an optical microscope or an electron microscope, the pre-aggregation particles (simply referred to as primary particles) that are forming the polymer particles maintain the shape thereof. The term coalescence means a state in which the primary particles do not maintain the shape thereof.

The polymer particles may be readily obtained by an emulsion polymerization method, or a polymerization method for a heterogeneous dispersion system, which is similar to the emulsion polymerization method. The polymer particles may also be obtained by an arbitrary method, such as a method in which a polymer obtained by homogenously polymerized in advance by a solution polymerization method, a bulk polymerization method or the like, is added together with a stabilizer into a solvent which does not dissolve the polymer, and the obtained mixture is mechanically mixed and dispersed.

For example, emulsion polymerization is carried out according to the method for production using an ionic surfactant or the like, and thus a polymer particle dispersion liquid is produced. Furthermore, even in the case of performing polymerization by another method, if the resin is oily and dissolves in a solvent having relatively low solubility in water, a dispersion liquid of polymer particles may be produced by dissolving the resin in such a solvent, dispersing the resin in water together with an ionic surfactant or a polymer electrolyte, using a dispersing machine such as a homogenizer, and then heating or lowering the pressure to evaporate the solvent.

Examples of the surfactant include anionic surfactants, such as a sulfuric acid ester or sulfonic acid salt-based surfactant, a phosphoric acid ester-based surfactant, a soap; cationic surfactants, such as an amine salt type surfactant and a quaternary ammonium salt type surfactants; nonionic surfactants, such as a polyethylene glycol-based surfactant, an alkylphenol ethylene oxide adduct-based surfactant, an alkyl alcohol ethylene oxide adduct-based surfactant, a polyhydric alcohol-based surfactants; various graft polymers, and the like, but are not particularly limited to these.

When a polymer particle dispersion liquid is produced by an emulsion polymerization method, a protective colloid layer may be formed by using a small amount of an unsaturated acid, for example, acrylic acid, methacrylic acid, maleic acid, styrenesulfonic acid or the like, and soap-free polymerization may be enabled. Therefore, such a method is preferable.

Examples of the polymerization initiator which may be used in the exemplary embodiment, include an azo-based polymerization initiator, a peroxide-based initiator and the like may. Among them, a water-soluble initiator is preferable.

Examples of the water-soluble azo initiator include 2,2'-azobis[N-(2-hydroxyethyl)-2-methyl-propionamidine]dihydrochloride, 2,2'-azobis(2-amidinopropane)dihydrochloride, 2,2'-azobis[2-(2-imidazolin-2-yl)propane]dihydrochloride, 2,2'-azobis[2-(2-imidazolin-2yl)propane], 4,4'-azobis(4-cyanovaleric acid), and the like.

Examples of the water-soluble peroxide-based initiator include ammonium persulfate, potassium persulfate, hydrogen peroxide and the like.

The amount of addition of the polymerization initiator is not particularly limited, but the amount of the polymerization initiator is preferably in the range of 0.05 parts by weight or more and 10 parts by weight or less, and more suitably 0.1 parts by weight or more and 5 parts by weight or less, relative to 100 parts by weight of the total monomer components.

The polymerization reaction may be performed under atmospheric pressure as well as under an increased pressure, but the reaction conditions other than these are applicable according to necessity, and are not particularly limited.

As for the reaction conditions, for example, it is preferable to perform a reaction under atmospheric pressure at a reaction temperature of 40° C. to 100° C. for 1 to 24 hours, while the emulsion liquid in which the emulsion particles are dispersed is stirred, from the viewpoint of obtaining the polymer particles at a high yield of about 80% or more.

The particle size of the polymer particles in the polymer particle dispersion liquid, as the volume average particle size, is preferably 0.1 μm (or about 0.1 μm) or more and 1.0 μm (or about 1.0 μm) or less, and more preferably in the range of 100 nm or more and 800 nm or less. If the volume average particle size exceeds 1.0 μm, dispersion stability may be deteriorated.

The volume average particle size of the polymer particles is measured with a laser diffraction type particle size distribution analyzer (trade name: LA-700, manufactured by Horiba, Ltd.).

The amount of acidic group of the polymer particles according to an exemplary embodiment of the invention is preferably in the range of 1.0 mmol/g (or about 1.0 mmol/g) or more and 3.0 mmol/g (or about 3.0 mmol/g) or less, and more preferably in the range of 1.5 mmol/g or more and 2.5 mmol/g or less.

If the amount of acidic group is less than 1.0 mmol/g, even when the acidic group is formed into a salt structure, favorable liquid absorbability may sometimes not be obtained when contacted with the ink. If the amount of the acidic group exceeds 3.0 mmol/g, liquid absorbability may be excessively increased, and handlability as the ink receiving particles may become lower, or the image quality may be decreased.

The amount of acidic group is determined by a general titration method as will be described later. For example, a reagent such as an ethanol solution of potassium hydroxide is added to the polymer particles in a certain amount, to perform a neutralization reaction, and the reaction product is separated into particles and a supernatant. The supernatant containing excess potassium hydroxide is titrated with a hydrochloric acid isopropanol solution or the like using an automated titration apparatus, and thereby the amount of carboxyl group is determined.

Furthermore, when, for example, the acidic group is a carboxyl group, and a salt structure ($-COO^-Y^+$: wherein $Y^+$ represents an alkali metal ion, an alkaline earth metal ion, or an organic cation such as ammonium) is formed by, for example, neutralization of the carboxyl group, the salt is converted to carboxylic acid with an acid such as hydrochloric acid, and then titration is performed as described above, to determine the amount of carboxyl group.

That is, the amount of carboxyl group (amount of acidic group) according to the exemplary embodiment means, in the case where the carboxyl group forms a salt structure, the amount of carboxyl group including the carboxyl group that contributes to the salt structure.

As described above, the ink receiving particles of the exemplary embodiment may be produced by: forming the polymer particles including a resin including an acidic group and a polyoxyethylene chain in advance by emulsion polymerization or the like, granulating (aggregated particles) the polymer particles in an aqueous medium, and then performing a neutralization reaction to obtain the ink receiving particles (method 1). Alternatively, the ink receiving particles may be produced by: forming the polymer particles including a resin including an acidic group and a polyoxyethylene chain in advance by emulsion polymerization or the like, aggregating and coalescing these polymer particles, and then pulverizing the resulting coalesced product (aggregated particles) (method 2).

In the case of method 1, the aggregated particles may be obtained by a drying-in-liquid method, which includes dissolving and dispersing the polymer particles including a resin including an acidic group and a polyoxyethylene chain, optionally another resin, and other additives in an organic solvent such as ethyl acetate, adding this oily mixed liquid in an aqueous medium where a dispersant and a stabilizer are present and emulsifying the mixture, by using an emulsifying machine or a dispersing machine to form an oil-in-water type aqueous suspension, and then removing the solvent. Subsequently, the aggregated particles obtained by the drying-in-liquid method are subjected to neutralization with a basic compound in the presence of water or a mixed liquid of water and a water-soluble organic solvent, and thereby the ink receiving particles of the exemplary embodiment of the invention are obtained. Since the aggregated particles according to the exemplary embodiment do not have a configuration in which the polymer particles are strongly coalesced and bonded to each other, the acidic group of the polymer particles is neutralized by the neutralization treatment described above.

According to the exemplary embodiment, the aggregated particles may be subjected to the neutralization treatment with a basic compound by adding a basic compound to an aqueous dispersion of the aggregated particles, or by mixing the aggregated particles to an aqueous solution having a basic compound dissolved therein. The neutralization treatment may be carried out in the same manner as in method 2, which will be described later.

In the case of method 2, in order to make the acidic group partially or entirely have a salt structure, the resin including the acidic group and a polyoxyethylene chain, which is contained in the polymer particles produced in advance by emulsion polymerization or the like, it is preferable to perform neutralization treatment with a basic compound or the like, before coalescing. As a results of this treatment, when the acidic group is, for example, a carboxyl group, the carboxyl group in the resin forms a salt structure so that the resin may have an increased liquid absorbability and may become prone to swell readily, and further, aggregation and coalescence that will be described later may be accelerated.

Regarding the method of forming a salt structure, for example, the polymer particles may be treated with a basic compound in the presence of water or a mixed liquid of water and a water-soluble organic solvent, as described above. In the exemplary embodiment, the neutralization treatment may be carried out by adding a basic compound in an aqueous dispersion liquid of the polymer particles, or the treatment may be carried out by mixing the polymer particles to an aqueous solution having a basic compound dissolved therein.

As the basic compound, any of an inorganic basic compound or an organic basic compound may be used. Specific examples include inorganic basic compounds such as sodium hydroxide, potassium hydroxide and ammonia; organic basic compounds such as tetramethylammonium hydroxide, and tetraethylammonium hydroxide; as well as basic alkylamines such as trimethylamine, diethylamine, triethylamine, tripropylamine and tributylamine; alkanolamines such as monoethanolamine, methylethanolamine, diethanolamine, diisopropanolamine, triethanolamine, dimethylaminoethanol, and morpholine; and the like.

Only one kind of the basic compound may be used, or two or more kinds of the basic compound may be used in combination. Furthermore, in view of the ease of removal of the basic compound after treatment, it is preferable to use an inorganic basic compound.

According to the exemplary embodiment, the amount of use of the basic compound is preferably in the range of 0.1% by weight or more and 20% by weight or less of the aqueous dispersion liquid of the polymer particles (aggregated particles). It is preferable that in the polymer particles obtained by a treatment with a basic compound, the carboxyl group entirely has a salt structure. However, the amount of use of the basic compound is usually set to be excess with respect to the amount of carboxyl group in the polymer particles.

In this case, the pH of the aqueous dispersion of the polymer particles is preferably 9 or higher, and more preferably 11 or higher. The treatment temperature is not particularly limited, but the temperature of the aqueous dispersion liquid may be raised to about 50° C. or higher and about 80° C. or lower. The treatment time is not limited, but may be usually 0.5 hours or more and 10 hours or less. Furthermore, the concentration of the polymer particles (aggregated particles) at the time of treatment is not particularly limited but may be usually in the range of 1% by weight or more and 5.0% by weight or less. If the polymer particles precipitate during the treatment time, it is preferable to appropriately stir the system. Then, the basic compound is removed by washing with water after the treatment.

In the exemplary embodiment, it is preferable to produce the ink receiving particles by a method based on method 2, from the viewpoint that the aggregation operation may be easy, and that occurrence of reaggregation at the time of taking out the aggregated particles after neutralization may be suppressed. Hereinafter, the aggregation and coalescence step and the pulverization step in method 2 will be described.

The aggregation and coalescence is, for example, first carried out by adding various other components to an aqueous dispersion liquid of the polymer particles which have been subjected to the neutralization treatment, according to necessity, and mixing the system. The method of mixing is not particularly limited, but a known mixing method is used. Examples of the mixing method include mechanical mixing methods such as a method of mixing the polymer particles and the like in an aqueous medium by rotating a special stirring blade such as a mixer at high speed; and a method of mixing by means of the shearing force of a rotor-stator known as a homogenizer; and a method of suspending the components by ultrasonic waves.

In regard to the aggregation and coalescence, particles of a conventional non-crosslinked resin may also be incorporated, in addition to the polymer particles, as resin particles that are used.

As for the non-crosslinked resin, those mentioned as examples of the additional resin (another resin) may be suitably used.

Among these, particularly when a polyester is used as the non-crosslinked polymer, the polymer may be effective for heating and fixings As the polyester, for example, a linear polyester resin formed from a polycondensate containing bisphenol A and a polyvalent aromatic carboxylic acid as main monomer components, may be preferably used.

Furthermore, a styrene-alkyl acrylate copolymer or a styrene-alkyl methacrylate copolymer may also be preferably used, from the viewpoint that control of properties may be easily achieved, and a mixing and dispersing treatment of a magnetic powder that will be described later may be easily achieved.

According to the exemplary embodiment, the polymer particles and the like may be made into a coalesced product by performing the aforementioned mixing such as stirring, and then directly performing freeze-drying or the like, or heating may be carried out during the mixing to result in aggregation and coalescence.

The coalesced product may be obtained by carrying out a solid-liquid separation step such as filtration, or if necessary, a washing step and a drying step. As for the drying step, any conventional method such as a vibration fluidized drying method, a spray drying method, a freeze-drying method, or a flash jet method, may be employed. In addition, at this point, it is preferable to adjust the water content of the coalesced product after drying, to 5% by weight or less, in view of facilitating pulverization.

Since the coalesced product may be obtained by the process in which the polymer particles in a gelated state in water undergo aggregation and coalescence, the coalesced product may tend to be obtained in a bulk form, not in a particulate form. Therefore, the coalesced product in a bulk state may be pulverized, in order to obtain ink receiving particles having a desired particle size.

The method of pulverization is not particularly limited, and may be carried out using, for example, a pulverization treatment unit that is known per se, such as a mortar, a ball mill or a jet mill.

The ink receiving particles (aggregated particles) after pulverization are in a particulate form, and the volume average particle size is preferably 1.0 μm (or about 1.0 μm) or more and 20.0 μm (or about 20.0 μm) or less, and more preferably 2.0 μm or more and 10.0 μm or less.

When the volume average particle size is in the aforementioned range, high image quality may be attained. That is, if the volume average particle size is larger than 20.0 μm, a difference in level may occur in the direction of height on the image surface between the parts where particles are present and the parts where particles are not present, and therefore, the image surface may not be flattened. On the other hand, if the volume average particle size is smaller than 1.0 μm, handlability of the particles may be decreased, and the particles may not sometimes be supplied to desired positions on the transfer body, which may lead to occurrences of sites where the ink receiving particles are absent on the image, and thus high speed recording and high image quality may sometimes not be achieved.

The volume average particle size of the ink receiving particles is measured after dispersing the ink receiving particles in distilled water and allowing the particles to stand for 24 hours at 23° C., using a COULTER MULTISIZER 3 (trade name, manufactured by Beckman Coulter, Inc.).

The ink receiving particles of the exemplary embodiment preferably has a BET specific surface area ($N_2$) of 1 $m^2/g$ or more and 750 $m^2/g$ or less, more preferably 5 $m^2/g$ or more and 600 $m^2/g$ or less, and even more preferably 10 $m^2/g$ or more and 400 $m^2/g$ or less. When the BET specific surface area falls in the above-mentioned range, the ink receiving particles may have a tendency of showing excellent rapid drying properties after receiving ink.

The ink receiving particles of the exemplary embodiment preferably has a value of the ratio of BET specific surface area ($CO_2$)/BET specific surface area ($N_2$) of 1 or more and 50 or less, more preferably 1 or more and 40 or less, and even more preferably 5 or more and 30 or less. When the ratio falls in the above-mentioned range, the ink receiving particles likewise may have a tendency of showing excellent rapid drying properties after receiving ink.

Here, the BET specific surface area ($N_2$) is measured using a BETASORB automatic surface area meter (model name: MODEL 4200, available from Nikkiso Co., Ltd.).

The BET specific surface area ($CO_2$) is also measured in a similar manner using a BETASORB automatic surface area meter (model name: MODEL 4200, manufactured by Nikkiso Co., Ltd.).

Next, the other additives of the ink receiving particles of the exemplary embodiment will be described. First, the ink receiving particles of the exemplary embodiment preferably contain a component capable of aggregating or thickening the components of an ink. When the ink receiving particles contain this component, the recording material (for example, a pigment or a dye) contained in the ink may aggregate, or the polymer or the like may be thickened, so that the image quality or fixability may be enhanced.

The component having such a function may be incorporated as a functional group of the polymer particles used in the ink receiving particles, or may be incorporated as a compound. As for the functional group, examples thereof include a carboxylic acid, a polyvalent metal cation, a polyamine, and the like.

As for the compound, preferable examples include aggregating agents of an inorganic electrolyte, an organic acid, an inorganic acid, an organic amine or the like.

Examples of the inorganic electrolyte include a salt of an alkaline metal ion such as a lithium ion, a sodium ion, a potassium ion, or a polyvalent metal ion such as an aluminum ion, a barium ion, a calcium ion, a copper ion, an iron ion, a magnesium ion, a manganese ion, a nickel ion, a tin ion, a titanium ion and a zinc ion; and an inorganic acid such as hydrochloric acid, hydrobromic acid, hydriodic acid, sulfuric acid, nitric acid, phosphoric acid and thiocyanic acid, an organic carboxylic acid such as acetic acid, oxalic acid, lactic acid, fumaric acid, citric acid, salicylic acid and benzoic acid, or an organic sulfonic acid.

Specific examples of the above inorganic electrolyte include an alkaline metal salt such as lithium chloride, sodium chloride, potassium chloride, sodium bromide, potassium bromide, sodium iodide, potassium iodide, sodium sulfate, potassium nitrate, sodium acetate, potassium oxalate, sodium citrate, and potassium benzoate; and a polyvalent metal salt such as aluminum chloride, aluminum bromide, aluminum sulfate, aluminum nitrate, aluminum sodium sulfate, aluminum potassium sulfate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium benzoate, calcium acetate, calcium salicylate, calcium tartrate, calcium lactate, calcium fumarate, calcium citrate, copper chloride, copper bromide, copper sulfate, copper nitrate, copper acetate, iron chloride, iron bromide, ion iodide, iron sulfate, iron nitrate, iron oxalate, iron lactate, iron fumarate, iron citrate, magnesium chloride, magnesium bromide, magnesium iodide, magnesium sulfate, magnesium nitrate, magnesium acetate, magnesium lactate, manganese chloride, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate.

Specific examples of the organic acids include arginine acid, citric acid, glycine, glutamic acid, succinic acid, tartaric acid, cysteine, oxalic acid, fumaric acid, phthalic acid, maleic acid, malonic acid, lycine, malic acid, and compounds represented by Formula (I) and derivatives thereof.

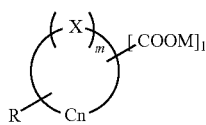

Formula (I)

In Formula (I), X represents O, CO, NH, NR$_1$, S or SO$_2$; R$_1$ represents an alkyl group and is preferably CH$_3$, C$_2$H$_5$ and C$_2$H$_4$OH; R represents an alkyl group and is preferably CH$_3$, C$_2$H$_5$ and C$_2$H$_4$OH; R may be included in the Formula or may not be included; X is preferably CO, NH, NR or O, and more preferably CO, NH or O; M represents a hydrogen atom, an alkali metal or an amine and is preferably H, Li, Na, K, monoethanol amine, diethanol amine, triethanol amine or the like, more preferably H, Na or K, and further preferably a hydrogen atom; n represents an integer of from 3 to 7 and is preferably an integer with which the heterocyclic ring is a six-membered or five-membered ring, and more preferably an integer with which the heterocyclic ring is a five-membered ring; and m represents 1 or 2. l represents an integer of from 1 to 5. When the compound represented by Formula (I) is a heterocyclic compound, the compound represented by Formula (I) may be a saturated ring or an unsaturated ring as long.

Examples of the compound represented by the Formula (I) include compounds having a structure of furan, pyrrole, pyrroline, pyrrolidone, pyrone, pyrrole, thiophene, indole, pyridine or quinoline, and further including a carboxyl group as a functional group. Specific examples of the compounds include 2-pyrrolidone-5-carboxylic acid, 4-methyl-4-pentanolide-3-carboxylic acid, furan carboxylic acid, 2-benzofuran carboxylic acid, 5-methyl-2-furan carboxylic acid, 2,5-dimethyl-3-furan carboxylic acid, 2,5-furan dicarboxylic acid, 4-butanolide-3-carboxylic acid, 3-hydroxy-4-pyrone-2,6-dicarboxylic acid, 2-pyrone-6-carboxylic acid, 4-pyrone-2-carboxylic acid, 5-hydroxy-4-pyrone-5-carboxylic acid, 4-pyrone-2,6-dicarboxylic acid, 3-hydroxy-4-pyrone-2,6-dicarboxylic acid, thiophene carboxylic acid, 2-pyrrole carboxylic acid, 2,3-dimethyl pyrrole-4-carboxylic acid, 2,4,5-trimethyl pyrrole-3-propionic acid, 3-hydroxy-2-indole carboxylic acid, 2,5-dioxo-4-methyl-3-pyrroline-3-propionic acid, 2-pyrrolidine carboxylic acid, 4-hydroxyproline, 1-methylpyrrolidine-2-carboxylic acid, 5-carboxy-1-methyl pyrrolidine-2-acetic acid, 2-pyridine carboxylic acid, 3-pyridine carboxylic acid, 4-pyridine carboxylic acid, pyridine dicarboxylic acid, pyridine tricarboxylic acid, pyridine pentacarboxylic acid, 1,2,5,6-tetrahydro-1-methyl nicotinic acid, 2-quinoline carboxylic acid, 4-quinoline carboxylic acid, 2-phenyl-4-quinoline carboxylic acid, 4-hydroxy-2-quinoline carboxylic acid, and 6-methoxy-4-quinoline carboxylic acid.

Preferable examples of the organic acid include citric acid, glycine, glutamic acid, succinic acid, tartaric acid, phthalic acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or derivatives or salts thereof. The organic acid is more preferably pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or a derivative or salt thereof The organic acid is further preferably pyrrolidone carboxylic acid, pyrone carboxylic acid, furan carboxylic acid, coumalic acid, or a derivative or salt thereof.

An organic amine compound may be any of a primary amine, secondary amine, tertiary amine, quaternary amine and a salt thereof. Specific examples of the organic amine compound include a tetraalkyl ammonium, alkylamine, benzalconium, alkylpyridium, imidazolium, polyamine and a derivative or salt thereof; such as amyl amnine, butyl amine, propanol amine, propyl amine, ethanol amine, ethyl ethanol amine, 2-ethyl hexyl amine, ethyl methyl amine, ethyl benzyl amine, ethylene diamine, octyl amine, oleyl amine, cyclooctyl amine, cyclobutyl amine, cyclopropyl amine, cyclohexyl amine, diisopropanol amine, diethanol amine, diethyl amine, di-2-ethylhexyl amine, diethylene triamine, diphenyl amine, dibutyl amine, dipropyl amine, dihexyl amine, dipentyl amine, 3-(dimethylamino)propyl amine, dimethyl ethyl amine, dimethyl ethylene diamine, dimethyl octyl amine, 1,3-dimethyl butyl amine, dimethyl-1,3-propane diamine, dimethyl hexyl amine, amino butanol, amino propanol, amino propane diol, N-acetyl amino ethanol, 2-(2-amino ethyl amino)ethanol, 2-amino-2-ethyl-1,3-propane diol, 2-(2-amino ethoxy)ethanol, 2-(3,4-dimethoxy phenyl)ethyl amine, cetyl amine, triisopropanol amine, triisopentyl amine, triethanol amine, trioctyl amine, trityl amine, bis(2-aminoethyl) 1,3-propane diamine, bis(3-aminopropyl)ethylene diamine, bis(3-aminopropyl)1,3-propane diamine, bis(3-amino propyl)methyl amine, bis(2-ethylhexyl)amine, bis(trimethyl silyl)amine, butyl amine, butyl isopropyl amine, propane diamine, propyl diamine, hexyl amine, pentyl amine, 2-methyl cyclohexyl amine, methyl propyl amine, methyl benzyl amine, monoethanol amine, lauryl amine, nonyl amine, trimethyl amine, triethyl amine, dimethyl propyl amine, propylene diamine, hexamethylene diamine, tetraethylene pentamine, diethyl ethanol amine, tetramethyl ammonium chloride, tetraethyl ammonium bromide, dihydroxy ethyl stearyl amine, 2-heptadecenyl-hydroxyethyl imidazoline, lauryl dimethyl benzyl ammonium chloride, cetyl pyridinium chloride, stearamid methyl pyridium chloride, a diallyl dimethyl a onium chloride polymer, a diallyl amine polymer, and a monoallyl amine polymer.

More preferable examples of the organic acid include triethanol amine, triisopropanol amine, 2-amino-2-ethyl-1,3-propanediol, ethanol amine, propane diamine, and propyl amine.

Among the above aggregating agents, polyvalent metal salts such as Ca(NO$_3$)$_2$, Mg(NO$_3$)$_2$, Al(OH$_3$), a polyaluminum chloride and the like, are preferably used.

The aggregating agent may be used alone or in combination of two or more kinds thereof. The content of the aggregating agent is preferably from 0.01% by weight to 30% by weight, more preferably from 0.1% by weight to 15% by weight, and further preferably from 1% by weight to 15% by weight.

The ink receiving particles of the exemplary embodiment may contain a releasing agent. When the ink receiving particles includes the releasing agent, the ink receiving particles may be transferred or fixed onto a recording medium in an oilless manner. The releasing agent may be contained in the organic resin, or may be included in the form of releasing agent particles by compounding with particles of organic resin.

Examples of the releasing agents include low molecular polyolefins such as polyethylene, polypropylene and polybutene; silicones having a softening point by heating; fatty acid amides such as oleic amide, erucic amide, ricinoleic amide and stearic amide; vegetable waxes such as camauba wax, rice wax, candelilla wax, Japan wax and jojoba oil; animal waxes such as beeswax; mineral or petroleum waxes such as montan wax, ozokerite, ceresin, paraffin wax, microcrystalline wax and Fischer-Tropsch wax; and modifications thereof. Among them, crystalline compounds are preferably used.

The ink receiving particles of the exemplary embodiment may further contain an external additive. When an external additive is externally added, powder fluidity may be imparted to the ink receiving particles, and control of electrical chargeability and conductivity, control of liquid absorbability, and the like may be enabled. Examples of the external additive include inorganic particles (colorless, pale colored or white particles, for example, colloidal silica, alumina, calcium carbonate, zinc oxide, titanium oxide, tin oxide, cerium oxide, carbon black, and the like), and resin particles particles of vinyl-based resins, polyesters, silicones and the like). The particles of these external additives may be hydrophobic or hydrophilic, and may also be surface treated with a coupling agent (for example, a silane coupling agent, or the like) and thereby have a specific functional group (for example, an amino group, a fluorine, or the like) introduced to the surface. The particle size of the external additive may be 5 nm or more and 100 nm or less, and preferably 10 nm or more and 50 nm or less, as the volume average particle size.

<Curable Resin Dispersion Composition>

The curable resin dispersion composition of an exemplary embodiment of the invention includes at least the ink receiving particles described above, and a curable resin. Specifically, the curable resin dispersion composition may be a product in which the ink receiving particles are dispersed in a curable solution containing a curable resin.

When the ink receiving particles of the exemplary embodiment are used in the form a curable resin dispersion composition in which the ink receiving particles are dispersed in a curable resin, for example, in the case of forming an inkjet recorded image on the recording medium via the intermediate transfer body, the peelability from the intermediate transfer body of the image recorded on the intermediate transfer body may be enhanced, and further more excellent image fixability may be obtained.

Examples of the curable resin include an ultraviolet-curable resin, an electron beam-curable resin, a thermosetting resin, and the like, and from the viewpoint of obtaining an effect that high quality and highly durable images may be recorded, it is preferable that the curable resin have at least any of a polyoxyethylene chain and a polyoxypropylene chain. An ultraviolet-curable resin may be easily cured, has a faster curing rate compared to other resins, and is easy to handle. An electron beam-curable resin does not require a polymerization initiator, and is easy to control coloration of layers after curing. A thermosetting resin may be cured without requiring large scale apparatuses. The curable resin is not limited to these, and for example, a curable resin which cures under the action of moisture, oxygen or the like may be used.

The curable solution containing the curable resin is desirably less volatile or non-volatile at normal temperature (25° C.). Here, the term less volatile means that the boiling point under atmospheric pressure is 200° C. or higher. The term non-volatile means that the boiling point under atmospheric pressure is 300° C. or higher. Hereinafter, the same applies.

Examples of the ultraviolet-curable resin include acrylic resins, methacrylic resins, urethane resins, polyester resins, maleimide resins, epoxy resins, oxetane resins, polyether resins, polyvinyl ether resins, and the like. A curable solution thereof contains at least one of an ultraviolet-curable monomer, an ultraviolet-curable macromer, an ultraviolet-curable oligomer, and an ultraviolet-curable prepolymer. Furthermore, the curable solution may contain, if necessary, an ultraviolet polymerization initiator for inducing an ultraviolet curing reaction.

Here, examples of the ultraviolet-curable monomer include acrylate monomers, methacrylate monomers, epoxy monomers, oxetane monomers, vinyl ether monomers, and the like. The macromer, oligomer and prepolymer may be a product obtained by polymerizing any of these monomers to predetermined degrees of polymerization, or may be epoxy acrylate, urethane acrylate, polyester acrylate, polyether acrylate, urethane methacrylate, polyester methacrylate or the like, produced by adding an acryloyl group or a methacryloyl group to an epoxy, urethane, polyester or polyether skeleton.

Examples of the ultraviolet polymerization initiator include radical photoinitiators such as acetophenone-based, benzophenone-based, benzoin ether-based, thioxanthone-based, acylphosphine oxide-based, peroxide-based and titanocene-based compounds; aryldiazonium salts, diaryliodonium salts, triarylsulfonium salts, and the like.

Examples of the electron beam-curable resin include acrylic resins, methacrylic resins, urethane resins, polyester resins, polyether resins, silicone resins, and the like. A curable solution thereof contains at least one of an electron beam-curable monomer, an electron beam-curable macromer, an electron beam-curable oligomer, and an electron beam-curable prepolymer.

As for the electron beam-curable monomer, macromer, oligomer and prepolymer, the materials described as the ultraviolet-curable materials may be mentioned.

Examples of the thermosetting resin include epoxy resins, polyester resins, phenolic resins, melamine resins, urea resins, alkyd resins, and the like. A curable solution thereof contains at least one of a thermosetting monomer, a thermosetting macromer, a thermosetting oligomer and a thermosetting prepolymer. Furthermore, a curing agent may be added for polymerization. The curable solution may also contain a thermal polymerization initiator for inducing a thermosetting reaction.

Here, examples of the thermosetting monomer include polyalcohols such as phenol, formaldehyde, bisphenol A, epichlorohydrin, cyanuric acid amide, urea and glycerin; acids such as phthalic anhydride, maleic anhydride and adipic acid; and the like. The macromer, oligomer and prepolymer may be a product obtained by polymerizing any of these monomers to predetermined degrees of polymerization, or may be epoxy prepolymers, polyester pepolymers, or the like.

Examples of the thermal polymerization initiator include an acid such as protic acid/Lewis acid, an alkali catalyst, a metal catalyst, and the like.

The curable solution may also contain water or an organic solvent for dissolving or dispersing the main components (any of monomer, macromer, oligomer and prepolymer, polymerization initiator, and the like) that contribute to the curing reaction. The proportion of the main component is preferably in the range of 30% by weight or more, more preferably 60% by weight or more, and even more preferably 90% by weight, or more.

The curable solution may also contain various coloring materials for the purpose of controlling coloration of layers after curing.

The viscosity of the curable solution is preferably in the range of 5 mPa·s or more and 10,000 mPa·s or less, more preferably 10 mPa·s or more and 1000 mPa·s or less, and even more preferably 15 mPa·s and more and 500 mPa·s or less. The viscosity of the curable solution is desirably higher than the viscosity of the ink.

The curable resin dispersion composition of the exemplary embodiment include the ink receiving particles of the exemplary embodiment dispersed in the curable solution.

As such, when the curable solution contains the ink receiving particles, the liquid ink component (for example, water or aqueous solvent) may be rapidly received into the ink receiving particles, and images may be rapidly fixed, and therefore, coloring mixing at the boundaries between inks, image uniformity, and non-uniform transfer of ink due to the pressure upon transfer may be decreased.

The volume average particle size of the ink receiving particles included in the curable resin dispersion composition is preferably 1 μm (about 1 μm) or more and 5 μm (about 5 μm) or less, and more preferably 2 μm or more and 4 μm or less. If the volume average particle size is less than 1 μm, fixability may be decreased. If the volume average particle size exceeds 5 μm, the image quality may be decreased.

The volume average particle size is measured using a laser diffraction type particle size distribution analyzer, a COULTER MULTISIZER (trade name, manufactured by Beckman Coulter, Inc.), or the like.

The content of the ink receiving particles in the curable resin dispersion composition is preferably in the range of 10% by weight or more and 90% by weight or less, and more preferably 20% by weight or more and 80% by weight or less, relative to the total weight of the curable resin dispersion composition.

The ink receiving particles according to the exemplary embodiment may have excellent dispersibility in the curable solution, particularly if the polymer particles include a resin containing a hydrophobic monomer structure. Evaluation of the dispersibility is, specifically, carried out by observing the state of particles when a desired amount of ink receiving particles is introduced into a curable solution prepared in accordance with the use, and the mixture is stirred. In this case, as the vessel for holding the curable solution, a glass vessel having an area of the opening of about 1 cm$^2$ to 10 cm$^2$ is used. In regard to this evaluation, it is preferable that the entire ink receiving particles is well dispersed in water, without floating on the liquid surface or depositing on the vessel wall after stirring.

The curable resin dispersion composition of the exemplary embodiment may also contain other additives. Specifically, a component capable of aggregating or thickening the components of ink may be preferable.

The component having this function may be incorporated as a functional group of the resin used in the ink receiving particles, or may be incorporated as a compound. Examples of the functional group include a carboxylic acid, a polyvalent metal cation, a polyamine, and the like. Examples of the compound include aggregating agents such as an inorganic electrolyte, an organic acid, an inorganic acid and an organic amine, and as such compounds, the compounds exemplified for the ink receiving particles may be used similarly.

Next, a recording method (recording apparatus) in which the ink receiving particles or the curable resin dispersion composition of the exemplary embodiment may be suitably used, will be briefly described.

The recording method (recording apparatus) is, for example, a recording method (recording apparatus) utilizing an ink containing a recording material, and the ink receiving particles of the exemplary embodiment, and the method (apparatus) may include, for example, allowing the ink receiving particles to receive an ink (receiving unit) and transferring the ink receiving particles that have received ink, onto a recording medium (transfer unit). The method (apparatus) may further include fixing the ink receiving particles that have been transferred onto the recording medium (fixation unit).

A specific example will be described. The ink receiving particles are supplied to an intermediate body (intermediate transfer body) in the form of a layer, by a supplying unit. An ink is ejected by an ink ejection unit and are received by the ink receiving particles supplied in the form of a layer (hereinafter, also referred to as "ink receiving particle layer"). The ink receiving particle layer having received the ink is transferred from the intermediate body to a recording medium by a transfer unit. This transfer is performed onto the overall surface of the ink receiving particle layer or is performed selectively onto recording areas (ink receiving areas) only. Thereafter, if necessary, pressure is applied (or heat and pressure are applied) against the ink receiving particle layer transferred onto the recording medium, by a fixation unit to effect fixation. As such, recording may be performed by using the ink receiving particles that have received an ink. The transfer and the fixation may be carried out simultaneously.

As for the recording medium, any of a penetrable medium (for example, ordinary paper, coated paper, or the like), and a non-penetrable medium (for example, a resin film, or the like) may be used. The recording medium is not limited to these, and other industrial products such as a semiconductor substrate may also be included in examples of the recording medium.

EXAMPLES

Hereinafter, the present invention will be described in detail by way of Examples, but the invention is not limited to these Examples. The terms "parts" and "%" used in the Examples represent, unless stated otherwise, "parts by weight" and "% by weight", respectively.

<Measurement Methods for Respective Property Values>

First, the measurement methods for the respective property values shown in the following Examples will be explained. The measurement methods that have been already described will be omitted.

(Water Absorption Ratio)

The water absorption ratio is measured according to JIS K7209 (1984), the disclosure of which is incorporated by reference herein, as follows.

First, dried ink receiving particles are placed in a beaker. Ion-exchanged water is placed therein, and the particles are immersed for 24 hours at 23° C. This particle dispersion liquid is transferred to a centrifuge tube, and is settled by centrifugation to obtain a cake of the particles. The separated supernatant is removed, and excess moisture remaining on the cake is absorbed with a filter paper. The mass of the centrifuge tube at this time, M2 (mg), is weighed, and then the cake is dried in a vacuum at 40° C. for 24 hours. The mass of the centrifuge tube after drying, M1 (mg), is weighed. From the these measurement values, the water absorption ratio, C (%), is calculated by the following formula (1).

$$\text{Water absorption rate, } C\,(\%)=[(M2-M1)/(M1-M3)]\times 100 \qquad \text{Formula (1)}$$

In Formula (1), M3 is the mass (mg) of the centrifuge tube.

(Amount of Acidic Group)

First, the polymer particles are weighed and placed in a test tube with a cap. 5 ml of DMF is added thereto, and the mixture is dispersed for one hour using an ultrasonic stirrer. The overall amount of the dispersion liquid is collected in a conical beaker, and a 0.1 M ethanolic solution of potassium hydroxide (manufactured by Wako Pure Chemical Industries, Ltd.) is added dropwise thereto, while phenolphthalein (manufactured by Wako Pure Chemical Industries, Ltd.) is used as an indicator.

A blank test in which polymer particles are not used is also performed, and from the difference between the two values, the amount of acidic group (mmol/g) is calculated by the following formula (2).

$$\text{Amount of acidic group} = ((F-E) \times 0.1 \times f)/W \quad \text{Formula (2)}$$

In the above formula (2), E represents the amount (ml) of the potassium hydroxide solution added dropwise in the blank test; F represents the amount (ml) of the potassium hydroxide solution for the sample; f represents the factor of the potassium hydroxide solution; and W represents the weight (g) of the polymer particles.

Example 1

(Production of Ink Receiving Particles)
Aqueous Phase
Ion exchanged water: 1000 parts
Surfactant (trade name: PELLEX CS, manufactured by Kao Corp.): 6.0 parts
Oil Phase
Polymerization initiator (potassium persulfate manufactured by Wako Pure Chemical Industries, Ltd.): 1.5 parts
Styrene (product of Wako Pure Chemical Industries, Ltd.): 4.5 parts
Phenoxypolyethylene glycol monomethacrylate (trade name: BLENMER PAE-100, manufactured by NOF Corporation): 32.5 parts
Mono-2-(methacryloyloxy)ethyl phthalate (trade name: ACRYESTER PA, manufactured by Mitsubishi Rayon Co., Ltd.): 72.0 parts
Divinylbenzene (product of Wako Pure Chemical Industries, Ltd., purity 55%): 1.1 parts In a nitrogen atmosphere, the aqueous phase of the above-described composition and the oil phase of the above-described composition are mixed, and the mixture is allowed to react for 12 hours at 60° C. After completion of the reaction, the reaction liquid is passed through a sieve having a mesh size of 20 μm. As a result, a small amount of aggregates having a size of 20 μm or larger remains on the sieve, but the generation amount of the aggregates is 4% of the amount of oil phase introduced. A portion of the passed liquid is taken and dried, and the polymer particles are observed with a scanning electron microscope (trade name: VE7800, manufactured by Keyence Corp.). The polymer particles are monodisperse polymer particles having a volume average particle size of 0.4 μm. The resulting polymer particles are washed by centrifugation, and then a portion is taken and dried in a vacuum. The amount of acidic group is measured and the thus measured amount of acidic group is 2.1 mmol/g. Subsequently, 800 parts of a 2% aqueous solution of sodium hydroxide is added to the slurry of the polymer particles washed by centrifugation, and the mixture is stirred for 5 hours at normal temperature (25° C.) to neutralize the carboxyl group. The volume average particle size and the amount of acidic group of the polymer particles are also presented in Table 1 (the same applies to the subsequent Examples and Comparative Examples).

The polymer particles thus neutralized are washed again by centrifugation, and then are dried in a vacuum under the conditions of 60° C. to thereby coalesce the particles. The resulting coalesced product of the polymer particles is placed in a ball mill pot and is pulverized with zirconia balls having a diameter of 10 mm. The pulverized product is subjected to a classification operation, and ink receiving particles having a volume average particle size of 3 μm are obtained. The water absorption ratio of these ink receiving particles is 500%. The volume average particle size and water absorption ratio of the ink receiving particles are also presented in Table 1 (the same applies to the subsequent Examples and Comparative Examples).

(Production of Curable Resin Dispersion Composition)
Polyurethane acrylate: 40 parts
Triacrylate of an ethylene oxide adduct of trimethylol: 30 parts
Methylbenzoyl benzoate photopolymerization initiator): 5 parts The above-mentioned components are mixed in a roll mill and a curable solution is obtained. 100 parts of this curable solution is mixed with 50 parts of the ink receiving particles, and a curable resin dispersion composition is obtained. In the production of this curable resin dispersion composition, the entire particles are well redispersed in water without floating on the water surface or depositing on the vessel wall, and thus the dispersibility is satisfactory.

(Evaluation)
-Ink for Evaluation-

As the ink for evaluation, a black ink is prepared as follows.
First, CAB-O-JET-300 (manufactured by Cabot Corp.) is treated with an ultrasonic homogenizer for 30 minutes, and then is subjected to centrifugation (7000 r.p.m., for 20 minutes) to obtain a pigment dispersion liquid (carbon concentration: 12.8%).

Subsequently, the following components are sufficiently mixed and pressure filtered through a 1-μm filter, and a black ink is obtained.

Pigment dispersion liquid: 40 parts
Glycerin: 20 parts
Surfactant (trade name: SURFINOL 465, manufactured by NOF Corporation): 1.5 parts
Pure water: 35 parts
-Image Formation- The curable resin dispersion composition is applied on a fluorine-coated resin belt using a bar coater to obtain a film thickness of 10 μm, and thus an ink receiving particle layer is formed. Characters and line images are printed thereon using the black ink, with a piezoelectric type recording head (resolution: 600 dpi).

Subsequently, the resin belt having images printed on the ink receiving particle layer, and an art paper (trade name: OK KINFUJI, manufactured by Oji Paper Co., Ltd.) are placed over each other and are pressed using a transferring apparatus (having a constitution by which the belt is pressed with a pressure roll formed from a stainless steel pipe having a diameter of 30 mm and coated with a fluorine-based resin; force pressing against the belt: linear pressure of 3 kgf/cm), and the resin belt is irradiated with UV radiation from the rear surface using a metal halide lamp having a lamp maximum power of 1.5 kW, to thus transfer the ink receiving particle layer onto the art paper.

-Evaluation of Transferability-

After the transferring using the transferring apparatus, the remnants on the resin belt after the transfer are visually observed and the peelability of the ink receiving particle layer is evaluated. If the amount of remnants is less than 10% in terms of area per unit area, the sample is judged to have good transferability. If the amount of remnants is 10% or more, the sample is judged to have poor transferability. The results are presented in Table 1.

-Evaluation of Bleeding-

An evaluation by visual inspection is performed on the character areas in the obtained print product. The criteria for evaluation are as follows, and grades G1 and G2 are practically non problematic. The results are presented in Table 1.

G1: No bleeding of characters is recognized.

G2: Slight bleeding of characters is recognized, but is practically non problematic.

G3: Bleeding of characters is conspicuous.

-Evaluation of Fixability-

One minute after printing, the image areas are rubbed with a finger, and staining of the finger is judged to evaluate the fixability. The criteria for evaluation are as follows, and grades G1 and G2 are practically non problematic. The results are presented in Table 1.

G1: No staining is observed.

G2: A slight staining is observed.

G3: Staining is observed.

-Evaluation of Speed of Water Absorption-

Ten seconds after printing, a high quality paper is placed over the image areas, and the stain adhered to the high quality paper is determined, to thus evaluate the speed of water absorption. The criteria for evaluation are as follows, and grades G1 and G2 are practically non problematic. The results are presented in Table 1.

G1: No staining is observed.

G2: A slight staining is observed.

G3: Staining is observed.

Example 2

(Production of Ink Receiving Particles)

Monodisperse polymer particles having a volume average particle size of 0.3 μm are prepared in substantially the same manner as in Example 1, except that 4.5 parts of styrene (product of Wako Pure Chemical Industries, Ltd.), 32.5 parts of phenoxypolyethylene glycol monomethacrylate (product of NOF Corporation), 72.0 parts of mono-2-(methacryloyloxy)ethyl phthalate (trade name: ACRYESTER PA, product of Mitsubishi Rayon Co., Ltd.), and 1.1 parts of divinylbenzene (manufactured by Wako Pure Chemical Industries, Ltd., purity: 55%) in Example 1 are changed to 78.0 parts of octoxypolyethylene glycol polypropylene glycol monomethacrylate (product of NOF Corporation), 97.0 parts of mono-2-(methacryloyloxy)ethyl phthalate (trade name: ACRYESTER PA, product of Mitsubishi Rayon Co., Ltd.), and 1.2 parts of divinylbenzene (manufactured by Wako Pure Chemical Industries, Ltd., purity. 55%). The polymer particles thus obtained is subjected to the neutralization of carboxyl group similarly to Example 1, and further, using the polymer particles thus neutralized, a polymer coalesced product is prepared in substantially the same manner as in Example 1.

The obtained polymer coalesced product is placed in a ball mill pot and is pulverized with zirconia balls having a diameter of 10 mm. The pulverized product is subjected to a classification operation, and ink receiving particles having a volume average particle size of 1.5 μm is obtained. The water absorption ratio of these ink receiving particles is 850%.

Subsequently, using the ink receiving particles thus obtained, a curable resin dispersion composition is produced in substantially the same manner as in Example 1, and the evaluation is performed in substantially the same manner as in Example 1. The results are presented in Table 1. The dispersibility of the particles in the curable resin dispersion composition in this case is satisfactory.

Example 3

(Production of Ink Receiving Particles)

Monodisperse polymer particles having a volume average particle size of 0.4 μm are prepared in substantially the same manner as in Example 1, except that 4.5 parts of styrene (product of Wako Pure Chemical Industries, Ltd.), 32.5 parts of phenoxypolyethylene glycol monomethacrylate (product of NOF Corporation), 72.0 parts of mono-2-(methacryloyloxy)ethyl phthalate (trade name: ACRYESTER PA, product of Mitsubishi Rayon Co., Ltd.), and 1, 1 parts of divinylbenzene (manufactured by Wako Pure Chemical Industries, Ltd., purity: 55%) in Example 1 are changed to 4.5 parts of styrene (manufactured by Wako Pure Chemical Industries, Ltd.), 35.0 parts of phenoxypolyethylene glycol-polypropylene glycol-monomethacrylate (product of NOF Corporation), 95 parts of mono-2-(methacryloyloxy)ethyl phthalate (trade name: ACRYESTER PA, product of Mitsubishi Rayon Co., Ltd.), and 1.1 parts of divinylbenzene (manufactured by Wako Pure Chemical Industries, Ltd., purity: 55%). The polymer particles thus obtained is subjected to the neutralization of carboxyl group similarly to Example 1, and further, using the polymer particles thus neutralized, a polymer coalesced product is prepared in substantially the same manner as in Example 1.

The obtained polymer coalesced product is placed in a ball mill pot and is pulverized with zirconia balls having a diameter of 10 mm. The pulverized product is subjected to a classification operation, and ink receiving particles having a volume average particle size of 1.0 μm are obtained. The water absorption ratio of these ink receiving particles is 450%.

Subsequently, using the ink receiving particles thus obtained, a curable resin dispersion composition is produced in substantially the same manner as in Example 1, and evaluation is performed in substantially the same manner as in Example 1. The results are presented in Table 1. The dispersibility of the particles in the curable resin dispersion composition in this case is satisfactory.

Example 4

(Production of Ink Receiving Particles)

A polymer coalesced product is prepared substantially in the same manner as in Example 1, except that 800 parts of the 2% aqueous solution of sodium hydroxide in Example 1 is changed to 800 parts of a 2% aqueous solution of ammonium hydroxide. The obtained coalesced product of polymer particles is placed in a ball mill pot and is pulverized with zirconia balls having a diameter of 10 mm. The pulverized product is subjected to a classification operation and ink receiving particles having a volume average particle size of 1.0 μm are obtained. The water absorption ratio of these ink receiving particles is 300%.

Subsequently, using the ink receiving particles thus obtained, a curable resin dispersion composition is produced in substantially the same manner as in Example 1, and evaluation is performed in substantially the same manner as in Example 1. The results are presented in Table 1. The dispersibility of the particles in the curable resin dispersion composition in this case is satisfactory.

Example 5

(Production of Ink Receiving Particles)

Monodisperse polymer particles having a volume average particle size of 0.2 μm are prepared in substantially the same manner as in Example 1, except that 4.5 parts of styrene product of Wako Pure Chemical Industries, Ltd.), 32.5 parts of phenoxypolyethylene glycol monomethacrylate (product of NOF Corporation), 72.0 parts of mono-2-(methacryloyloxy)ethyl phthalate (trade name: ACRYESTER PA, product of Mitsubishi Rayon Co., Ltd.), and 1.1 parts of divinylbenzene (manufactured by Wako Pure Chemical Industries, Ltd., purity: 55%) in Example 1 are changed to 4.5 parts of styrene (manufactured by Wako Pure Chemical Industries, Ltd.), 35.0 parts of phenoxypolyethylene glycol-polypropylene glycol-monomethacrylate (product of NOF Corporation), 95 parts of mono-2-(methacryloyloxy)ethyl phthalate (trade name: ACRYESTER PA, product of Mitsubishi Rayon Co., Ltd.), and 2.0 parts of divinylbenzene (manufactured by Wako Pure Chemical Industries, Ltd., purity: 55%). The polymer particles thus obtained is subjected to the neutralization of carboxyl group similarly to Example 1, and further, using the polymer particles thus neutralized, a polymer coalesced product is prepared in substantially the same manner as in Example 1.

The obtained polymer coalesced product is placed in a ball mill pot and is pulverized with zirconia balls having a diameter of 10 mm. The pulverized product is subjected to a classification operation, and ink receiving particles having a volume average particle size of 1.0 μm are obtained. The water absorption ratio of these ink receiving particles is 250%.

Subsequently, using the ink receiving particles thus obtained, a curable resin dispersion composition is produced in substantially the same manner as in Example 1, and the evaluation is performed in substantially the same manner as in Example 1. The results are presented in Table 1. The dispersibility of the particles in the curable resin dispersion composition in this case is satisfactory.

Example 6

Polymerization is carried out in the same manner as in Example 1, except that 72.0 parts of mono-2-(methacryloyloxy)ethyl phthalate (trade name: ACRYESTER PA, product of Mitsubishi Rayon Co., Ltd.) in Example 1 is changed to 22.3 parts of methacrylic acid (product Of Wako Pure Chemical Industries, Ltd.). The reaction liquid is passed through a sieve having a mesh size of 20 μm, but a large quantity of aggregates having a size of 20 μm or more remain on the sieve. A portion of the reaction liquid is taken and observed with a scanning electron microscope (trade name: VE7800, manufactured by Keyence Corp.) similarly. The polymer particles are irregularly shaped polymer particles having a wide particle size distribution ranging from 10 μm to 100 μm. The polymer particles are subjected to the neutralization of the carboxyl group similarly to Example 1. Thereafter, the thus neutralized polymer particles are pulverized, and ink receiving particles having an average particle size of 6 μm is obtained. Then, using the ink receiving particles thus obtained, a curable resin dispersion composition is produced in substantially the same manner as in Example 1. Evaluation is performed using this dispersion composition in substantially the same manner as in Example 1. The results are summarized in Table 1.

Example 7

Polymerization is carried out in substantially the same manner as in Example 1, except that 4.5 parts of styrene, 32.5 parts of phenoxypolyethylene glycol monomethacrylate and 72.0 parts of mono-2-(methacryloyloxy)ethyl phthalate in Example 1 are changed to 28.0 parts, 35.0 parts and 18.0 parts, respectively, of the same materials. After completion of the reaction, the reaction liquid is passed through a sieve having a mesh size of 20 μm, but there are almost no aggregates having a size of 20 μm or more remaining on the sieve. A portion of the reaction liquid is taken and observed with a scanning electron microscope (trade name: VE7800, manufactured by Keyence Corp.). The polymer particles are monodisperse polymer particles having a volume average particle size of 0.2 μm. The obtained polymer particles are washed by centrifugation, and then a portion thereof is taken and dried in a vacuum. The amount of acidic group is measured and the amount of acidic group thus measured is 0.8 mmol/g. The polymer particles thus obtained is subjected to the neutralization of carboxyl group similarly to Example 1, and further, using the polymer particles thus neutralized, a polymer coalesced product is prepared as substantially in the same manner as in Example 1.

The obtained polymer coalesced product is placed in a ball mill pot and is pulverized with zirconia balls having a diameter of 10 mm. The pulverized product is subjected to a classification operation to obtain ink receiving particles having a volume average particle size of 5.0 μm. The water absorption ratio of these ink receiving particles is 150%.

Subsequently, a curable resin dispersion composition is prepared in substantially the same manner as in Example 1. Evaluation is performed using this dispersion composition in substantially the same manner as in Example 1. The results are summarized in Table 1.

Example 8

(Production of Ink Receiving Particles)

Monodisperse polymer particles having a volume average particle size of 0.4 μm are prepared in substantially the same manner as in Example 1, except that 1.1 parts of divinylbenzene (manufactured by Wako Pure Chemical Industries, Ltd., purity: 55%) in Example 1 is changed to 0.4 parts of divinylbenzene (manufactured by Wako Pure Chemical Industries, Ltd., purity: 55%). The polymer particles thus obtained is subjected to the neutralization of carboxyl group similarly to Example 1, and further, using the polymer particles thus neutralized, a polymer coalesced product is prepared as substantially in the same manner as in Example 1.

The obtained polymer coalesced product is placed in a ball mill pot and is pulverized with zirconia balls having a diameter of 10 mm. The pulverized product is subjected to a classification operation to obtain ink receiving particles having a volume average particle size of 3.0 μm. The water absorption ratio of these ink receiving particles is 4500%.

Subsequently, a curable resin dispersion composition is produced in substantially the same manner as in Example 1, and evaluation is performed in substantially the same manner as in Example 1. The results are presented in Table 1. The dispersibility of the particles in the curable resin dispersion composition in this case is satisfactory.

Example 9

(Production of Ink Receiving Particles)

Monodisperse polymer particles having a volume average particle size of 0.4 μm are prepared in substantially the same manner as in Example 1, except that 1.1 parts of divinylbenzene (manufactured by Wako Pure Chemical Industries, Ltd., purity: 55%) in Example 1 is changed to 0.1 parts of divinylbenzene (manufactured by Wako Pure Chemical Industries, Ltd., purity: 55%). The polymer particles thus obtained is subjected to the neutralization of carboxyl group similarly to Example 1, and further, using the polymer particles thus neutralized, a polymer coalesced product is prepared in substantially the same manner as in Example 1.

The obtained polymer coalesced product is placed in a ball mill pot and is pulverized with zirconia balls having a diameter of 10 mm. The pulverized product is subjected to a classification operation, and ink receiving particles having a volume average particle size of 3.0 μm are obtained. The water absorption ratio of these ink receiving particles is 5400%.

Subsequently, a curable resin dispersion composition is produced in substantially the same manner as in Example 1, and evaluation is performed in substantially the same manner as in Example 1. The results are presented in Table 1. The dispersibility of the particles in the curable resin dispersion composition in this case is satisfactory.

Example 10

(Production of Ink Receiving Particles)

Ink receiving particles having a volume average particle size of 0.8 μm are prepared in the similar manner as in Example, but a planetary ball mill is used instead of placing the obtained polymer coalesced product in a ball mill pot in Example 2, and the product is pulverized with zirconia balls having a diameter of 5 mm, and is subjected to a classification operation. The water absorption ratio of these ink receiving particles is 850%.

Subsequently, a curable resin dispersion composition is produced in substantially the same manner as in Example 1, and evaluation is performed in substantially the same manner as in Example 2. The results are presented in Table 1. In addition, the dispersibility of the particles in the curable resin dispersion composition in this case is satisfactory, but the viscosity is so high that the product yield becomes poor when obtaining a 10-μm thick coating film.

Example 11

(Production of Ink Receiving Particles)

Monodisperse polymer particles having a volume average particle size of 0.2 μm are prepared in substantially the same manner as in Example 1, except that 4.5 parts of styrene (product of Wako Pure Chemical Industries, Ltd.), 32.5 parts of phenoxypolyethylene glycol monomethacrylate (product of NOF Corporation), 72.0 parts of mono-2-(methacryloyloxy)ethyl phthalate (trade name: ACRYESTER PA, product of Mitsubishi Rayon Co., Ltd.), and 1.1 parts of divinylbenzene (manufactured by Wako Pure Chemical Industries, Ltd., purity: 55%) in Example 1 are changed to 36.5 parts of styrene (manufactured by Wako Pure Chemical Industries, Ltd.), 78.0 parts of octoxypolyethylene glycol-polypropylene glycol-monomethacrylate (product of NOF Corporation), and 1.5 parts of divinylbenzene (manufactured by Wako Pure Chemical Industries, Ltd., purity: 55%). 200 parts of tetrachloroethane is added to 100 parts of a dried product of these polymer particles, and the mixture is heated at 60° C. for 30 minutes. After cooling, 500 parts of chlorosulfonic acid is added in small portions, and the mixture is stirred for 4 hours at room temperature. Subsequently, glacial acetic acid is added until hydrogen chloride is not generated, and the resulting product is poured into a large amount of water. A precipitated resin is washed with acetone and pure water. Subsequently, 800 parts of a 2% aqueous solution of sodium hydroxide is added to the washed slurry of the polymer particles, and the mixture is stirred for 5 hours at normal temperature (25° C.), to neutralize the sulfo group.

Using the polymer particles thus neutralized, a polymer coalesced product is prepared in substantially the same manner as in Example 1.

The obtained polymer coalesced product is placed in a ball mill pot and is pulverized with zirconia balls having a diameter of 10 mm. The pulverized product is subjected to a classification operation, and ink receiving particles having a volume average particle size of 1.5 μm are obtained. The water absorption ratio of these ink receiving particles is 600%.

Subsequently, a curable resin dispersion composition is produced in substantially the same manner as in Example 1, and evaluation is performed in substantially the same manner as in Example 1. The results are presented in Table 1. The dispersibility of the particles in the curable resin dispersion composition in this case is satisfactory.

Example 12

(Production of Ink Receiving Particles)

Monodisperse polymer particles having a volume average particle size of 0.4 μm are prepared in substantially the same manner as in Example 1, except that 4.5 parts of styrene (product of Wako Pure Chemical Industries, Ltd.), 32.5 parts of phenoxypolyethylene glycol monomethacrylate (product of NOF Corporation), 72.0 parts of mono-2-(methacryloyloxy)ethyl phthalate (trade name: ACRYESTER PA, product of Mitsubishi Rayon Co., Ltd.), and 1.1 parts of divinylbenzene (manufactured by Wako Pure Chemical Industries, Ltd., purity: 55%) in Example 1 are changed to 2.0 parts of styrene (manufactured by Wako Pure Chemical Industries, Ltd.), 10.0 parts of phenoxypolyethylene glycol-polypropylene glycol-monomethacrylate product of NOF Corporation), 95 parts of mono-2-(methacryloyloxy)ethyl phthalate (trade name: ACRYESTER PA, product of Mitsubishi Rayon Co., Ltd.), and 1.1 parts of divinylbenzene (manufactured by Wako Pure Chemical Industries, Ltd., purity: 55%). The polymer particles thus obtained is subjected to the neutralization of carboxyl group similarly to Example 1, and further, using the polymer particles thus neutralized, a polymer coalesced product is prepared in substantially the same manner as in Example 1.

The obtained polymer coalesced product is placed in a ball mill pot and is pulverized with zirconia balls having a diameter of 10 mm. The pulverized product is subjected to a classification operation, and ink receiving particles having a volume average particle size of 3.0 μm are obtained. The water absorption ratio of these ink receiving particles is 1500%.

Subsequently: a curable resin dispersion composition is produced in substantially the same manner as in Example 1, and evaluation is performed substantially in the same manner as in Example 1. The results are presented in Table 1. The dispersibility of the particles in the curable resin dispersion composition in this case is satisfactory.

Comparative Example 1

(Production of Ink Receiving Particles)
Porous silica particles (inorganic porous particles: volume average particle size 30 nm, BET specific surface area ($N_2$) 280 m$^2$/g): 40 parts Polyacrylic acid (partially crosslinked) resin particles (organic resin particles: volume average particle size 400 mn, liquid absorptive resin, acid value 120 mg KOH/g, Tg=40° C.): 60 parts is prepared in substantially the same manner as in Example 1. Evaluation is performed using this dispersion composition in substantially the same manner as in Example 1. The results are summarized in Table 1.

TABLE 1

|  | Polymer particles | | Ink receiving particles | | Evaluation results | | | |
| --- | --- | --- | --- | --- | --- | --- | --- | --- |
|  | Volume average particle size (μm) | Amount of acidic group (mmol/g) | Volume average particle size (μm) | Water absorption ratio (%) | Speed of water absorption | Transferability | Bleeding | Fixability |
| Example 1 | 0.4 | 2.1 | 3.0 | 500 | G1 | Good | G1 | G1 |
| Example 2 | 0.3 | 1.9 | 1.5 | 850 | G1 | Good | G1 | G1 |
| Example 3 | 0.4 | 2.2 | 1.0 | 450 | G1 | Good | G1 | G1 |
| Example 4 | 0.4 | 2.3 | 1.0 | 300 | G1 | Good | G1 | G2 |
| Example 5 | 0.2 | 2.0 | 1.0 | 250 | G1 | Good | G1 | G2 |
| Example 6 | 10-100 | 1.1 | 6.0 | 1000 | G1 | Good | G3 | G3 |
| Example 7 | 0.2 | 0.8 | 5.0 | 150 | G2 | Good | G3 | G3 |
| Example 8 | 0.4 | 2.3 | 3.0 | 4500 | G1 | Good | G2 | G3 |
| Example 9 | 0.4 | 2.3 | 3.0 | 5400 | G1 | Good | G3 | G3 |
| Example 10 | 0.3 | 1.9 | 0.8 | 850 | G2 | Good | G1 | G1 |
| Example 11 | 0.2 | 2.4 | 1.5 | 600 | G2 | Good | G3 | G3 |
| Example 12 | 0.4 | 3.1 | 3.0 | 1500 | G1 | Good | G3 | G3 |
| Comparative Example 1 | 2.2 | 1.2 | 2.2 | 2000 | G3 | Poor | G3 | G3 |
| Comparative Example 2 | 0.3 | 2.2 | 3.0 | 300 | G2 | Poor | G3 | G3 |

Polyvinyl alcohol: 2.5 parts

Polyallylamine: 2.5 parts

The above-described composition is mixed by stirring (about 30 seconds with a sample mill), and then a trace amount of an aqueous solution of sodium hydroxide is added. The mixture is treated intermittently in a mechanofusion system to obtain composite particles. The particle size is measured for every intermittent driving condition, and the particles are taken out at a stage where the particle size reaches about 2.2 μm. 1 part of silica, 1 part of paraffin wax (trade name: OX-3215, manufactured by Nippon Seiro Co., Ltd.), and 0.15 parts of stearyl alcohol are added to 100 parts of the particles in a sample mill, and the mixture is mixed by stirring while the mixture is heated. Thus, ink receiving particles having a volume average particle size of 2.2 μm are produced. The water absorption ratio of these ink receiving particles is 2000%. Using the ink receiving particles, a curable resin dispersion composition is prepared in substantially the same manner as in Example 1, and evaluation is performed using this dispersion composition in substantially the same manner as in Example 1. The results are summarized in Table 1.

Comparative Example 2

Polymerization is performed in the same manner as in Example 1, except that 32.5 parts of phenoxypolyethylene glycol monomethacrylate in Example 1 is changed to 23.0 parts of benzyl methacrylate. After completion of the reaction, the reaction liquid is passed through a sieve having a mesh size of 20 μm, but there are almost no aggregates having a size of 20 μm or more remaining on the sieve. A portion of the reaction liquid is taken and observed with a scanning electron microscope (trade name: VE7800, manufactured by Keyence Corp.). The polymer particles are monodisperse polymer particles having a volume average particle size of 0.3 μm. The obtained polymer particles are washed by centrifugation, and then a portion thereof is taken and dried in a vacuum. The amount of acidic group is measured and the amount of acidic group thus measured is 2.2 mmol/g. Using the polymer particles, a curable resin dispersion composition is prepared in substantially the same manner as in Example 1. Evaluation is performed using this dispersion composition in substantially the same manner as in Example 1. The results are summarized in Table 1.

The forgoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. Ink receiving particles comprising polymer particles, the polymer particles comprising a resin including an acidic group, a polyoxyethylene chain and a polyoxypropylene chain, the acidic group at least partially having a salt structure, wherein the resin contained in the polymer particles is a copolymer including the following structural unit (A) and structural unit (B):

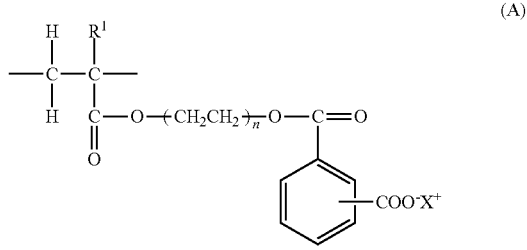

-continued

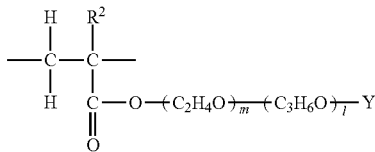

wherein, in the structural unit (A) and the structural unit (B), $R^1$ and $R^2$ each independently represent a hydrogen atom or a methyl group; n represents an integer of from 1 to 18: m represents an integer of from 1 to 30; l represents an integer of from 1 to 18; $X^{30}$ +represents an alkali metal ion, an alkaline earth metal ion, or a quaternary ammonium ion; and Y represents an alkyl group having 1 to 30 carbon atoms or an aryl group having 6 to 18 carbon atoms.

2. The ink receiving particles of claim 1, wherein the acidic group is a carboxyl group.

3. The ink receiving particles of claim 1, wherein a molar ratio of the structural unit (A) and a molar ratio of the structural unit (B) are each independently from about 10% by mole to about 90% by mole.

4. The ink receiving particles of claim 1, wherein the resin is an amorphous resin.

5. The ink receiving particles of claim 1, wherein the resin has a glass transition temperature (Tg) of from about 0° C. to about 100° C.

6. The ink receiving particles of claim 1, wherein the resin has a weight average molecular weight of from about 1,000 to about 1,000,000.

7. The ink receiving particles of claim 1, wherein resin has an acid value of from about 50 mg/KOH/g to about 1,000 mg/KOH/g in terms of carboxyl group (—COOH) equivalent.

8. The ink receiving particles of claim 1, wherein the polymer particles are prepared by an emulsification polymerization method.

9. The ink receiving particles of claim 1, wherein the polymer particles have a volume average particle size of about 0.1 μm to about 1.0 μm, and the ink receiving particles are formed by at least one of the group consisting of aggregation and coalescence of the polymer particles.

10. The ink receiving particles of claim 1, wherein the content of the acidic group in the polymer particles is from about 1.0 mmol/g to about 3.0 mmol/g relative to the polymer particles, and the ink receiving particles have a volume average particle size of from about 1.0 μm to about 20 μm.

11. The ink receiving particles of claim 1, wherein the ink receiving . particles have a water absorption ratio of from about 200% to about 5000%.

12. A curable resin dispersion composition comprising the ink receiving particles of claim 1 and a curable resin.

13. The curable resin dispersion composition of claim 12, wherein the curable resin includes at least one selected from the group consisting of a polyoxyethylene chain and a polyoxypropylene chain.

14. The curable resin dispersion composition of claim 12, wherein the ink receiving particles have a volume average particle size of from about 1 82 m to about 5 μm.

15. A method of manufacturing ink receiving particles, the method comprising:
preparing polymer particles comprising a resin containing an acidic group, a polyoxyethylene chain and a polyoxypropylene chain, and having an average particle size of about 1 μm or less;
neutralizing the acidic group of the polymer particles with a base; and
aggregating the polymer particles to form aggregated particles,
wherein the resin contained in the polymer particles is a copolymer including the following structural unit (A) and structural unit (B):

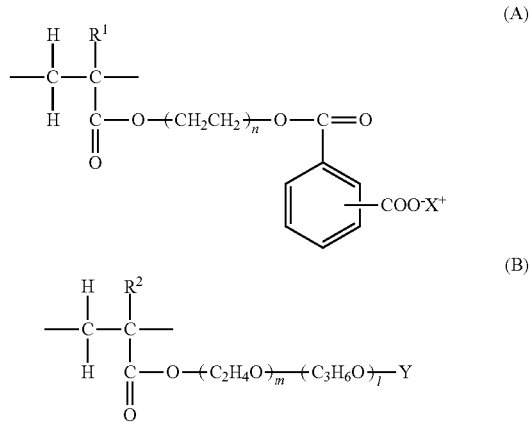

wherein, in the structural unit (A) and the structural unit (B), $R^1$ and $R^2$ each independently represent a hydrogen atom or a methyl group; n represents an integer of from 1 to 18: m represents an integer of from 1 to 30; l represents an integer of from 1 to 18; $X^+$+represents an alkali metal ion, an alkaline earth metal ion, or a quaternary ammonium ion; and Y represents an alkyl group having 1 to 30 carbon atoms or an aryl group having 6 to 18 carbon atoms.

16. The method of manufacturing ink receiving particles of claim 15, wherein the aggregating of the polymer particles to form aggregated particles comprises:
aggregating and coalescing the polymer particles; and
pulverizing the aggregated and coalesced polymer particles.

17. The method of manufacturing ink receiving particles of claim 15, wherein after the pulverizing of the aggregated and coalesced polymer particles, the ink receiving particles have a volume average particle size of from about 1 μm to about 20 μm.

18. The ink receiving particles of claim 1, wherein the structural unit (A) is a structure derived from mono-2-(methacryloyloxy)ethyl phthalate, and the structural unit (B) is a structure derived from at least one selected from the group consisting of octoxypolyethylene glycol-polypropylene glycol-monomethacrylate and phenoxypolyethylene glycol-polypropylene glycol-monomethacrylate.

19. The method of manufacturing ink receiving particles of claim 15, wherein the structural unit (A) is a structure derived from mono-2-(methacryloyloxy)ethyl phthalate, and the structural unit (B) is a structure derived from at least one selected from the group consisting of octoxypolyethylene glycol-polypropylene glycol-monomethacrylate and phenoxypolyethylene glycol-polypropylene glycol-monomethacrylate.

* * * * *